US005258857A

United States Patent [19]

Ichinose

[11] Patent Number: 5,258,857

[45] Date of Patent: Nov. 2, 1993

[54] IMAGE INPUT DEVICE AND METHOD FOR READING A PICTURE IMAGE

[75] Inventor: Shuuichi Ichinose, Nagano, Japan

[73] Assignee: Seiko Epson Corporation, Tokyo, Japan

[21] Appl. No.: 887,216

[22] Filed: May 21, 1992

Related U.S. Application Data

[60] Division of Ser. No. 773,737, Oct. 9, 1991, which is a continuation of Ser. No. 351,633, May 15, 1989, abandoned.

[30] Foreign Application Priority Data

May 16, 1988 [JP] Japan ................................ 63-118704
Mar. 17, 1989 [JP] Japan ................................ 1-65029

[51] Int. Cl.[5] ........................................ H04N 1/028

[52] U.S. Cl. ................................ 358/474; 358/475; 358/483; 358/494; 358/497

[58] Field of Search ............... 358/475, 474, 485, 483, 358/497, 494

[56] References Cited

U.S. PATENT DOCUMENTS 4,310,773 1/1982 Zukow et al. ..................... 313/594
4,887,002 12/1989 Dobashi et al. ................... 313/594
4,889,090 2/1990 Yoshike et al. ................... 313/607
4,959,737 9/1990 Nakatani ........................ 358/475
4,996,606 2/1991 Kawai et al. .................... 358/475

FOREIGN PATENT DOCUMENTS 0165550 12/1985 European Pat. Off. .
3718216A1 12/1987 Fed. Rep. of Germany .
52-44081 4/1977 Japan .
0094358 5/1984 Japan .
64-67858 3/1989 Japan .

*Primary Examiner*—Edward L. Coles, Sr.
*Assistant Examiner*—Scott A. Rogers
*Attorney, Agent, or Firm*—Blum Kaplan

[57] ABSTRACT

An image input device including a rare gas cold cathode discharge tube is provided to read an irradiated picture image using a photoelectric transducer element. The rare gas cold cathode tub includes a linear tube including a main electrode, an auxiliary electrode and a conductive member connected to the auxiliary electrode for preventing deflections of a positive column formed along the auxiliary electrode. The tube is successively powered on and off. Three of such tubes of different colors may be provided and the irradiated picture image may be read by a storage type photoelectric transducer element.

19 Claims, 8 Drawing Sheets

FIG. 1
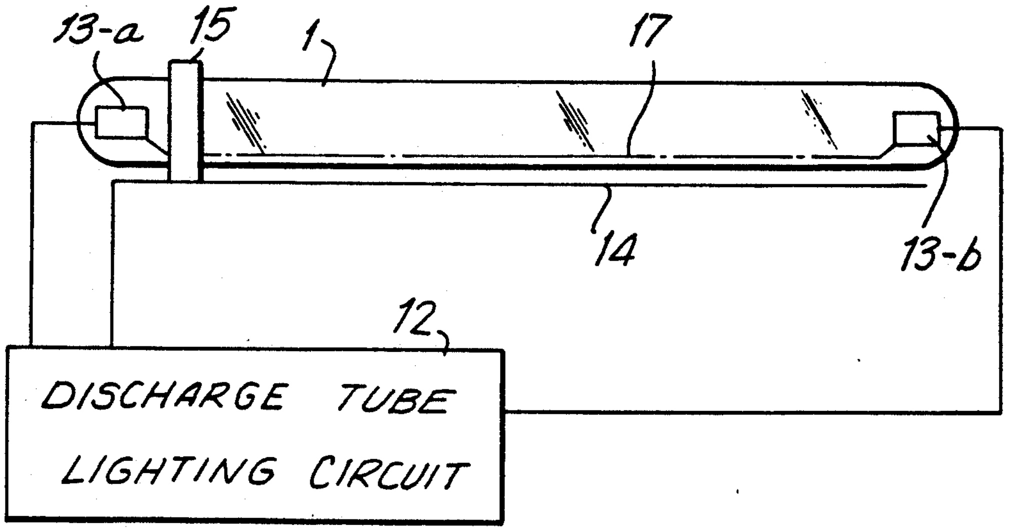
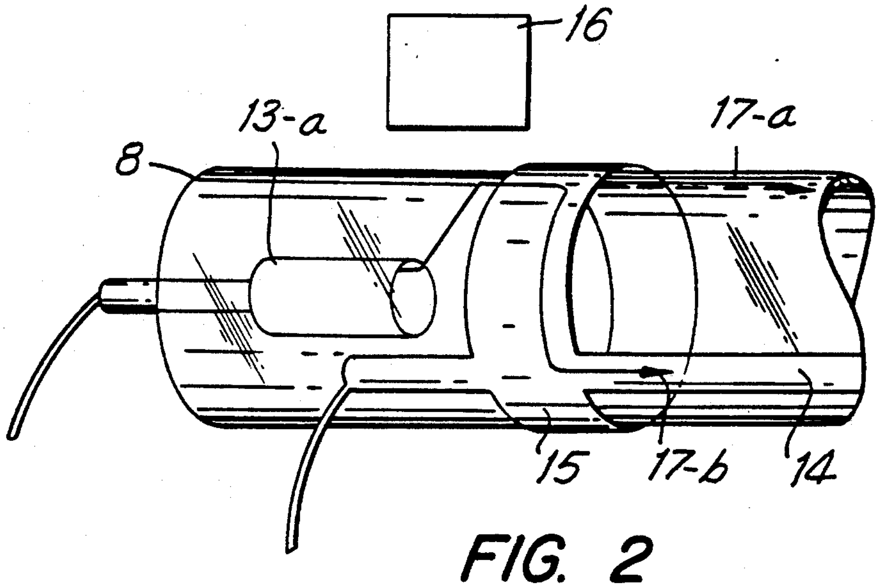
FIG. 2

IMAGE INPUT DEVICE AND METHOD FOR READING A PICTURE IMAGE

This is a division of application Ser. No. 07/773,737, filed on Oct. 9, 1991, which is a continuation of application Ser. No. 07/351,633, filed on May 15, 1989, and now abandoned.

BACKGROUND OF THE INVENTION

This invention relates to a rare gas cold cathode discharge tube for an image input device used for inputting image into computers.

An image input unit used for inputting images such a photographs and the like into computers may be classified by its reading system. The first type is a camera type image input unit which functions to read at 20 milliseconds or less using photoelectric transducer elements in a two-dimensional array. This type of device is mainly used for reading images which change with time. However, since the optical path length for imaging must be set during construction, a large space is required for the unit Additionally, the picture image must be irradiated entirely-by light of a uniform brightness. Thus, it is difficult to obtain an accurate density value of the picture image. A highly precise manufacturing technique, which increases the cost, is also necessary since the photoelectric transducer elements are arranged two-dimensionally.

The second type of image input device is a drum scanner having an imaging system for reading one point and photoelectric transducer elements. To read the picture image, while rotating a picture image on a drum, the photoelectric transducer elements are shifted axially to the direction of rotation. The reading resolution is controlled by selecting a reading resolution arbitrarily by controlling the speed of the drum and the rate of movement of the photoelectric transducers. Thus a relatively high resolution may be attained. However, since the resolution depends on the mechanical precision of the component parts, the cost of the device may be high. Additionally, the device is unavoidably large.

The final type of image input device is an image scanner having photoelectric transducer elements such as a CUD (charge coupled device) and the like in a one-dimensional array. The image is read by shifting the photoelectric transducer elements relative to a picture image in a direction vertical to the array.

The image scanner type device has advantages over the camera type device and the drum scanner type device. The image scanner type device has a higher read rate than the drum type device and is smaller than both the camera type and drum type devices. Thus an image scanner having photoelectric transducer elements in a one-dimensional array is relatively inexpensive, compact and high in resolution.

An LED array, a fluorescent lamp, a linear halogen lamp or the like are employed as the lighting apparatus used in the image scanner to irradiate the picture image in the direction in which the photoelectric transducer elements are arrayed. However, a tone representation capacity is required in an image input unit. Unless the density value of the picture image is quantized into, for example, 8 to 256 gradations for loading, a picture image such a photograph or the like with a fine change in intermediate density cannot be accurately loaded. Thus the picture image must be irradiated uniformly by a constant brightness, and, consequently, a lighting apparatus providing a stable amount of light is necessary.

A rare gas cold cathode discharge tube charged with xenon or neon has a feature that the amount of light produced is almost constant regardless of temperature of the working environment in comparison to a general fluorescent lamp tube using mercury as shown in FIG. 16. Accordingly, when a conventional fluorescent lamp tube charged with mercury is used, it must be warmed up by a heating apparatus such as an electric heater or the like. Thus a time or between about 1 and 2 minutes or so is required before actuation. The rare gas cold cathode discharge tube, however, is ready for use as soon as the power is turned on. The electrode is small in shape and the tube is miniaturized in overall size as, for example. between about 1 and 6 mm in diameter, since the electrode is not heated. The power consumption of the rare gas cold cathode discharge tube is also low, for example, between about 4 and 10 watts, and the luminous color is arbitrarily selected by choosing the fluorescent material applied inside the tube. Thus a rare gas cold cathode discharge tube is appropriate not only for a facsimile but also as a light source of an image scanner for reading color picture images.

If a picture image read on a color image scanner is printed directly by a color printer, the picture image obtained will be dark, different in hue from the original picture image and inferior in saturation since the reflective spectral characteristics of the existing color inks are not ideal. Thus color correction is necessary to correct color imbalance due to the spectral characteristics of the inks used on the printer.

In order to perform the color correction process, density values for the three primary colors, green, red and blue, are necessary for each picture element corresponding to the reading resolution. The volume of data required is extremely large and therefore a device for performing color correction is expensive, and the time required for calculating color correction is long. Thus, brightly colored printed matter is not achievable using general computers.

Color correction is performed quickly and cheaply by a line sequential reading system. The conventional system, a page sequential system, required the entire color picture to be read three times in green, red and blue. In the line sequential system however, data of the three primary colors, green, red and blue, is loaded at every reading. Thus the full picture image is read in one scan. In the line sequential reading system, the volume of data necessary for color correction work may be minimized to one several thousandths of the data is a page sequential system (in the case or A4 size paper). Using a semiconductor RAM capable of writing and reading as a storage device for color correction, and also by providing an integrated circuit for color correction in the image scanner, color correction can be carried out during the reading, and the color correction data may thereafter be sent to a host computer.

As described above, compared with a general fluorescent lamp tube charged with mercury, the rare gas cold cathode discharge tube provides a more stable amount of light with environmental temperature change and is more compact. However, it has defects as when used as a light source for reading picture images. That is, the amount of light produced during intermittent lighting, which is necessary for line sequential reading, is not stable. Once it is lit, a rare gas cold cathode discharge tube can be used as continuously maintained lighting for several seconds or longer.

In a rare gas cold cathode discharge tube, the charged gas pressure is high, between about 50 and 200 mmHg, while in a fluorescent lamp tube charged with mercury the charged gas pressure is several tens mmHg. Thus a straight bright line called a positive column is observed along the discharge tube at the time of lighting. To stably locate the positive column at a specified portion of the rare gas cold cathode discharge tube, an auxiliary electrode is provided along a wall of the rare gas cold cathode discharge tube, thereby emitting light.

In the prior art, when repeating the intermittent lighting at a period of several milliseconds or so, the positive column is not stabilized and drawn toward the auxiliary electrode, the amount of light of the rare gas cold cathode discharge tube is not constant, and the brightness of the read image changes. Specifically, while the positive column exists at all times, the light emitting position fluctuates within the discharge tube to approach or go away from the desired picture image. Thus the quantity of light for irradiating the picture image fluctuates 1 to 10 percent.

In high performance image reader for reading a fine density picture image at gradations of 32 to 256, even this small fluctuation in the quantity of light may exert an influence on the reproduced picture, and a stripe is produced even though the picture image read had a uniform density.

Accordingly, it is desirable to provide an improved image input device having a light source which produces a stable amount of light during intermittent lighting.

SUMMARY OF THE INVENTION

Generally speaking, in accordance with the invention, an image input device having a rare gas cold cathode discharge tube for irradiating a picture image is provided. The rare gas cold cathode discharge tube includes a linear tube charged with rare gas having a main electrode. An auxiliary electrode is provided along the direction in which the tube is extended. To prevent the deflection of a positive column formed along the auxiliary electrode from the main electrode, a discharge stabilizing conductive member is positioned near the main electrode. The conductive member is electrically connected to the auxiliary electrode toward the central portion of the tube and surrounds the main electrode.

The image input device includes at least two rare gas cold cathode discharge tubes of different luminous colors. The rare gas cold cathode discharge tubes are subjected to intermittent lighting and different colors are sequentially irradiated on the original picture image. The original picture image is read by a storage type photoelectric transducer element in the time interval after the powering off of the tubes. The irradiation levels are selected to fall between the photoelectric transducer element dark output value and the saturation output value.

Accordingly, it is an object of this invention to provide an improved image input device capable of reading color picture images in a highly accurate manner.

Another object of the invention is to provide an improved image input device capable of providing a stable amount of light during repeated intermittent lighting.

A further object of the invention is to provide an improved image input device capable of quick and inexpensive color correction.

Still another object of the invention is to provide an improved image input device which is relatively compact.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of rare gas cold cathode discharge tube for an image input device in accordance with a first embodiment of the invention;

FIG. 2 is an enlarged fragmented perspective view of rare gas cold cathode discharge tube in accordance with the invention;

DETAILED DESCRIPTION OF THE PREFERRED EMBODIMENTS

Figure 15:
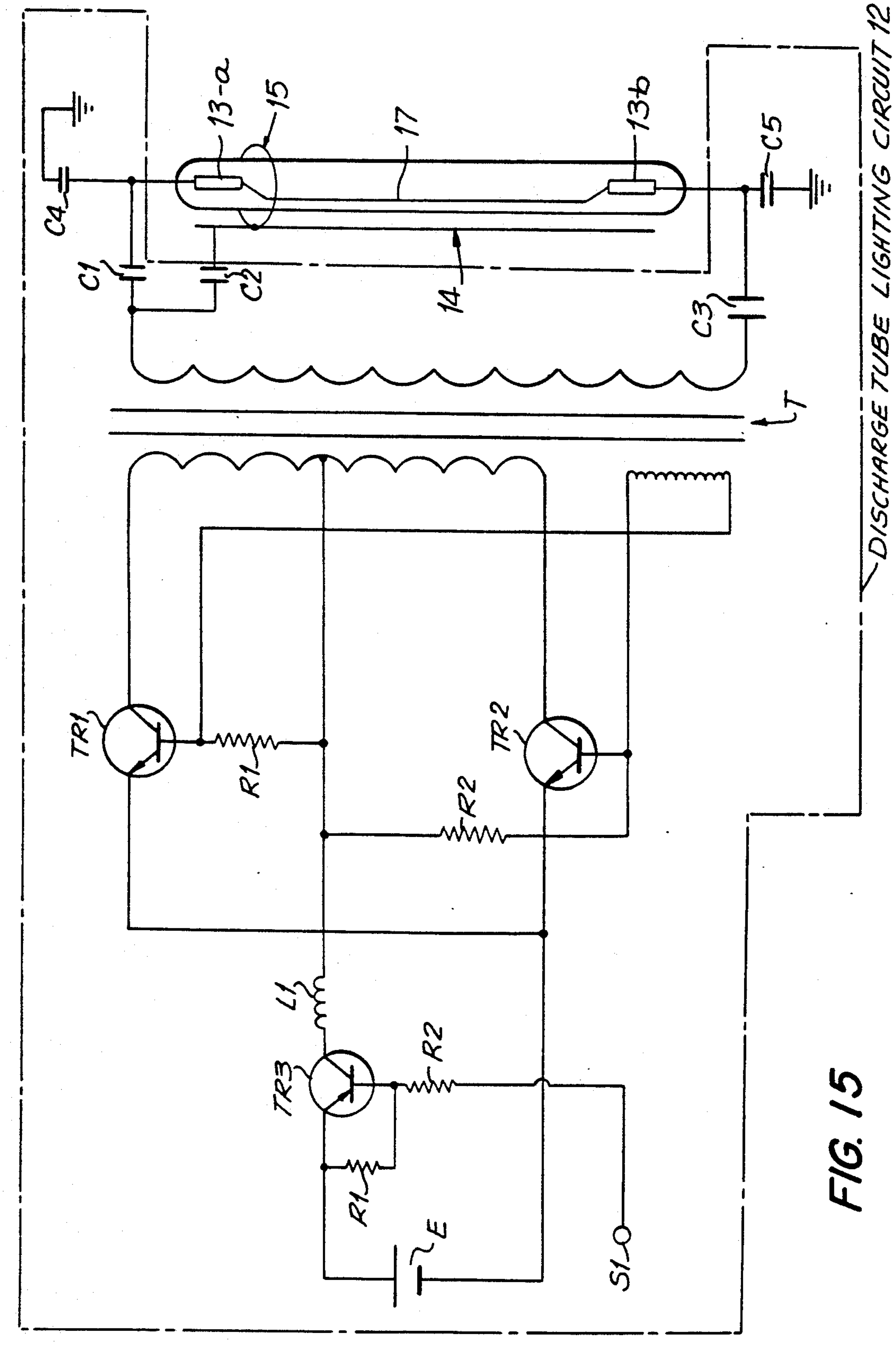
FIG. 15 is an electric circuit diagram for operating a rare gas cold cathode discharge tube.

FIG. 1 depicts a rare gas cold cathode discharge tube generally indicated as 1 for an image input device in accordance with the invention. Rare gas cold cathode discharge tube 1 is electrically connected at main electrodes 13*a*, 13*b* and an auxiliary electrode 14 to a discharge tube lighting circuit 12 and supplied with electrical power. FIG. 15 illustrates one example of discharge tube lighting circuit 12. The power supply E is preferably 12 V or 24 V DC. A transistor $TR_3$ is switched on by a lighting signal S1 and to control lighting of discharge tube 1. A high frequency high voltage alternating current of between about 500 and 2000 V and between about 10 and 50 KHz is supplied to discharge tube 1 on self oscillation by transistors $TR_1$, $TR_2$ and a boosting transformer T. Resistors R, and R2 and inductor L, control the operation of transistors $TR_1$, $TR_2$ and $TR_3$.

Capacitors C1, C2, C3 limit the current flowing in the discharge tube, and have a capacitance of between about 50 and 200 picofarads, preferably 120 picofarads. Capacitors C4, C5 have a capacitance of between about 5 and 30 picofarads and stabilize the positive column, a bright line formed by a current flowing in the discharge tube. The potential of main electrodes 13*a*, 13*b* is stabilized by providing the capacitors, and a stable discharge state can be maintained even when discharge tube 1 is intermittently lit by repeatedly lighting and darkening discharge tube 1. It is preferred that one of the terminals of capacitors C4, C5 is grounded.

Auxiliary electrode 14 is formed of a hardened conductive adhesive containing carbon. The width of auxiliary electrode 14 is between about 0.1 and 2 mm, preferably 0.8 mm. The resistance value of auxiliary electrode 14 is between about 1 and 20 kiloohms per centimeter, preferably between about 3 and 6 kiloohms per centimeter of length.

FIG. 2 illustrates the process of discharging main electrode 13*a*. A conductive member 15 is formed of a conductive adhesive containing powder, such as copper, carbon or the like and surrounds discharge tube 1 in the vicinity of main electrode 13*a* but intermediate main electrodes 13*a* and 13*b*. Conductive member 15 is electrically connected to auxiliary electrode 14. Both conductive member 15 and auxiliary electrode 14 are deposited on the envelope 8 of the discharge tube.

The process of lighting discharge tube 1 is accomplished in the following manner. First, a high frequency high voltage alternating current is supplied to main electrodes 13*a*, 13*b* by discharge tube lighting circuit 12. An electron beam is generated from main electrode 13*a* and flies through the rare gas, for example xenon gas, and travels to main electrode 13*b*. The electron beam excites the rare gas to a plasma state. Prior to reverting to the gaseous state, the plasma generates ultraviolet rays, visible light and infrared rays spectrally characteristic of the gas. This develops into a bright line and is observed as a positive column 17. The ultraviolet rays excite the fluorescent substance applied to the inner wall of the envelope 8 of the discharge tube. By selecting the fluorescent substance accordingly, a luminescence of arbitrary visible light such as blue, green, red, white, etc. is seen. For example, the fluorescent substances are (YE) $_2O_3$for red, $ZN_2SiO_4$; MN for green and 3($B_2$, Mg) 0.8 $Al_2O_3$; Eu for blue.

If a voltage is supplied to auxiliary electrode 14 to produce a potential difference between main electrodes 13*a*, 13*b* by the discharge tube lighting circuit 12 shown in FIG. 15, positive column 17 generated from main electrodes 13*a*, 13*b* is drawn to the discharge tube inner wall along auxiliary electrode 14 and firmly stabilized.

If, however, a conductive material 16 (a material having a capacitance with the positive column and exerting an influence on formation of the positive column) is disposed near main electrodes 13*a*, 13*b* of discharge tube 1 at the time of intermittent lighting, the positive column generated from main electrode 13*a* is drawn to conductive material 16, and the path 17*a* shown in dashed lines will not be stabilized on auxiliary electrode 14. Conductive material 16 may be the rail for carrying the discharge tube assembly during charging on other support members. Conductive member 15 suppresses the deflection of the positive column. In other words, when conductive member 16 is disposed around the end of main electrode 13*a* facing main electrode 13*b*, and the positive column is not drawn thereto if conductive member 15 is provided. Conductive member 15 and auxiliary electrode 14 each have a electric potential. Thus, the positive column is caught on conductive member 15 and a path 17*b* is formed immediately along auxiliary electrode 14. Once the positive electrode is caught on auxiliary electrode 14, the positive column is stabilized, since it never comes outside of position of auxiliary electrode 14, even when a conductive material is disposed nearby.

Conductive member 15 is preferably positioned in front (in the direction of discharge) of a discharge position of main electrodes 13*a*, 13*b*. It is preferable to form conductive member 15 at a position about one to five mm from main electrode 13*a*.

Figure 17:
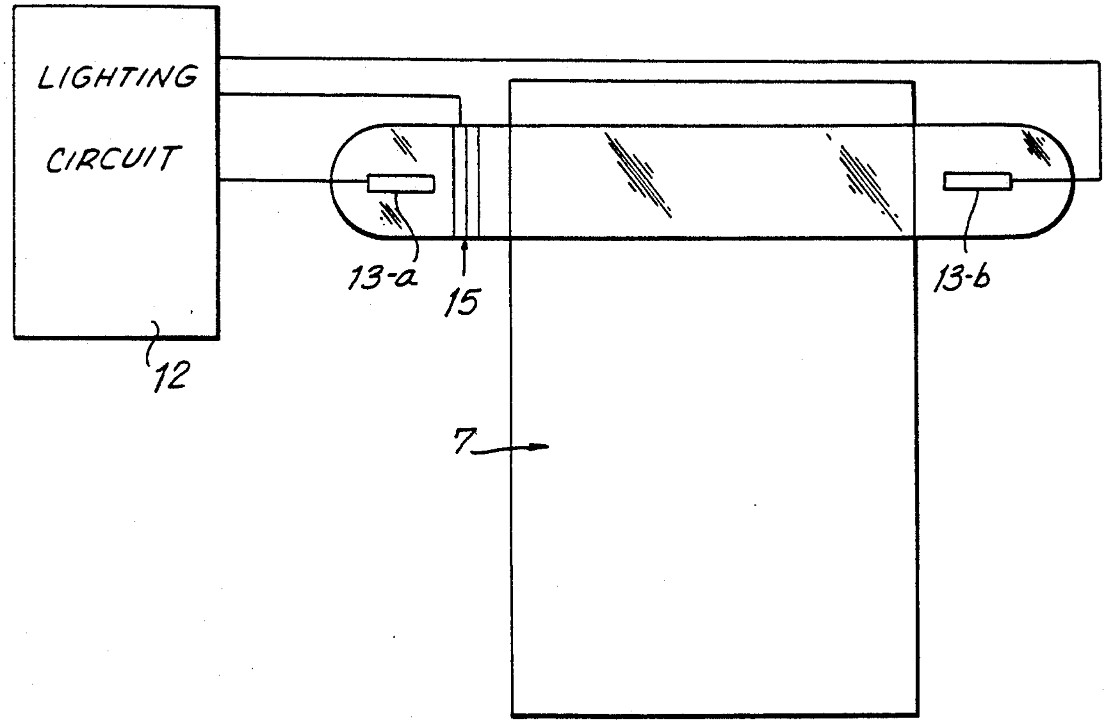
FIG. 17 shows the relationship between a rare gas cold cathode discharge tube and a picture image.

FIG. 17 shows the relationship between the rare gas cold cathode discharge tube and picture image 7. The length of rare gas cold cathode discharge tube 1 must be greater than the width or picture image 7. Conductive member 15 is preferably disposed between about 3 and 10 mm beyond the end portion of picture image 7 to prevent an unevenness in quantity of light. However, when a clear electrode, such as tin or the like is used, the above restriction does not apply.

Figure 5:
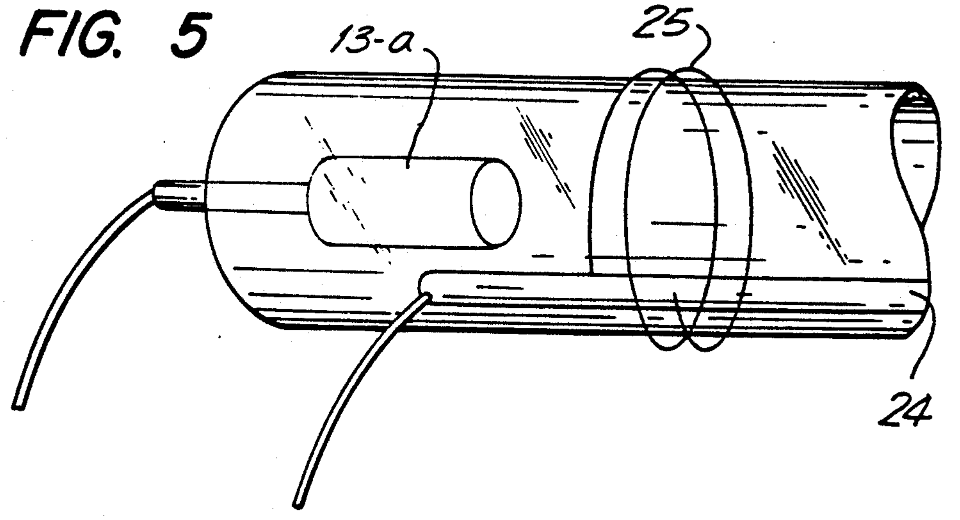
FIG. 5 is an enlarged fragmented perspective view of a rare gas cold cathode discharge tube in accordance with a second embodiment of the invention.

FIG. 5 is a fragmented perspective view of a rare gas cold cathode discharge tube for an image input device in accordance with a second embodiment of the invention. Conductive member 25 is formed of a piano wire fixed to discharge tube 1 by a spring force and electrically connected to auxiliary electrode 24 by a conductive adhesive. In comparison to the first embodiment of the invention, the process of construction of conductive member 25 in the second embodiment is much simpler since it does not require application of a conductive adhesive along its entire path and is thus moderate in cost.

Figure 6:
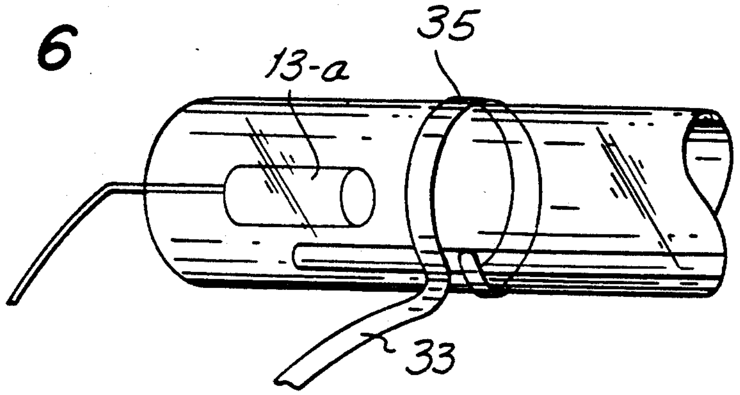
FIG. 6 is an enlarged fragmented perspective view of a rare gas cold cathode discharge tube in accordance with a third embodiment of the invention.

FIG. 6 is an enlarged fragmented perspective view of a rare gas cold cathode discharge tube for an image input device in accordance with a third embodiment of the invention. A conductive member 35 is formed by winding a lead wire 33 of auxiliary electrode 34 around discharge tube 1.

Figure 7:
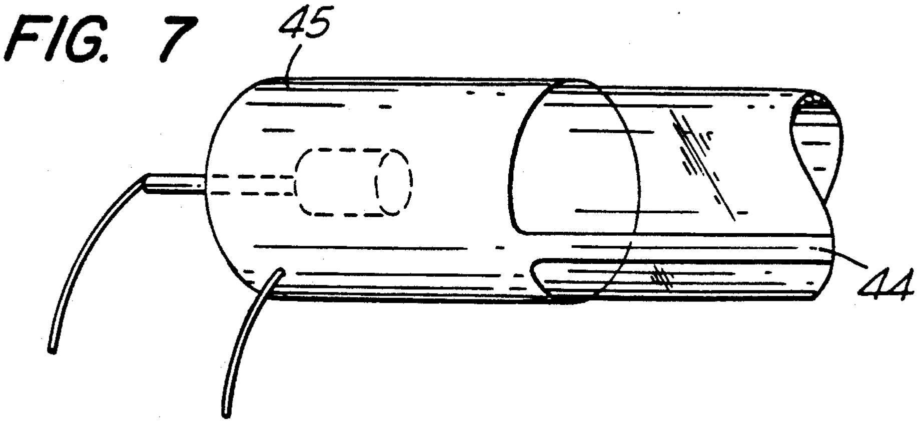
FIG. 7 is an enlarged fragmented perspective view of a rare gas cold cathode discharge tube in accordance with a fourth embodiment of the invention.

FIG. 7 is an enlarged fragmented perspective view of a rare gas cold cathode discharge tube for an image input device in accordance with a fourth embodiment of the invention. A conductive member 45 is formed by soaking the envelope of discharge tube 1 in a conductive liquid adhesive to coat the entire end of the envelope. However, the surface of discharge tube 1 must be insulated from main electrodes 13*a*, 13*b*. An auxiliary electrode 44, extending along at least a portion the length of discharge tube 1 is also formed by soaking the envelope of discharge tube 1 in a conductive liquid adhesive and is formed integral with conductive member 45.

Figure 8:
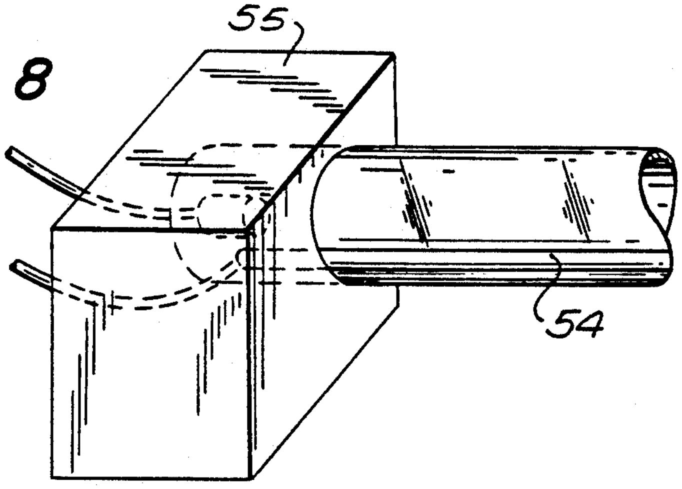
FIG. 8 is an enlarged fragmented perspective view of a rare gas cold cathode discharge tube in accordance with a fifth embodiment of the invention.

FIG. 8 is an enlarged fragmented perspective view of a rare gas cold cathode discharge tube for an image input device in accordance with a fifth embodiment of the invention. A conductive member 55 consists of a box formed of plates a metal or other conductive material. An auxiliary electrode 54, electrically connected to conductive member 55, extends along at least a portion of discharge tube 1. Conductive member 55 also secures and supports discharge tube 1.

Figure 9:
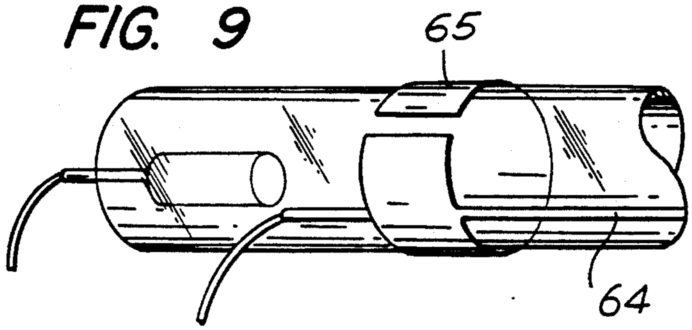
FIG. 9 is an enlarged fragmented perspective view of a rare gas cold cathode discharge tube in accordance with a sixth embodiment of the invention.

FIG. 9 is an enlarged fragmented perspective view of a rare gas cold cathode discharge tube for an image input device in accordance with a sixth embodiment of the invention. A conductive member 65 does not completely encircle discharge tube 1. However conductive member 65 is of sufficient length in the region of auxiliary electrode 64 to sufficiently stabilizes the positive column. An auxiliary electrode 64 is electrically connected to conductive member 65.

Figure 10:
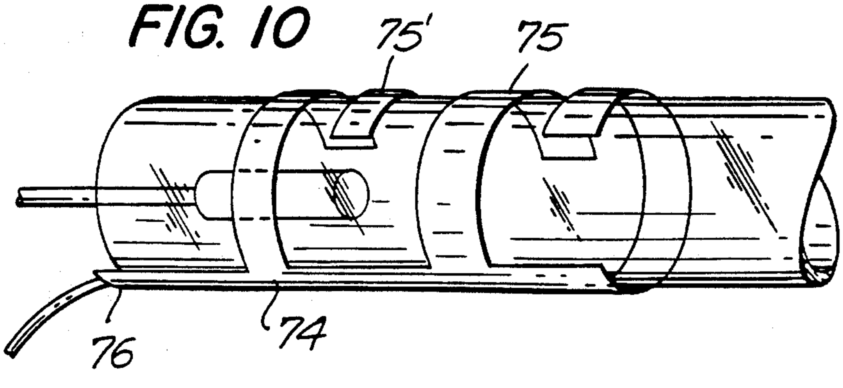
FIG. 10 is an enlarged fragmented perspective view of a rare gas cold cathode discharge tube in accordance with a seventh embodiment of the invention.

FIG. 10 is an enlarged fragmented perspective view of a rare gas cold cathode discharge tube for an image input device in accordance with a seventh embodiment of the invention. Conductive member 75 is formed of a sheet of phosphor bronze and defines to provide a spring material for grabbing the envelope and is about 0.2 mm in thickness. Conductive member 75 is curved cylindrically and fixed to discharge tube 1. Conductive member 75 has a projection 76 which functions as a positioning member in the direction of rotation (circumferential direction) of discharge tube 1. A plurality of conductive spring arms 75' are defined. An auxiliary electrode 74 is formed integral with conductive member 75.

Figure 3:
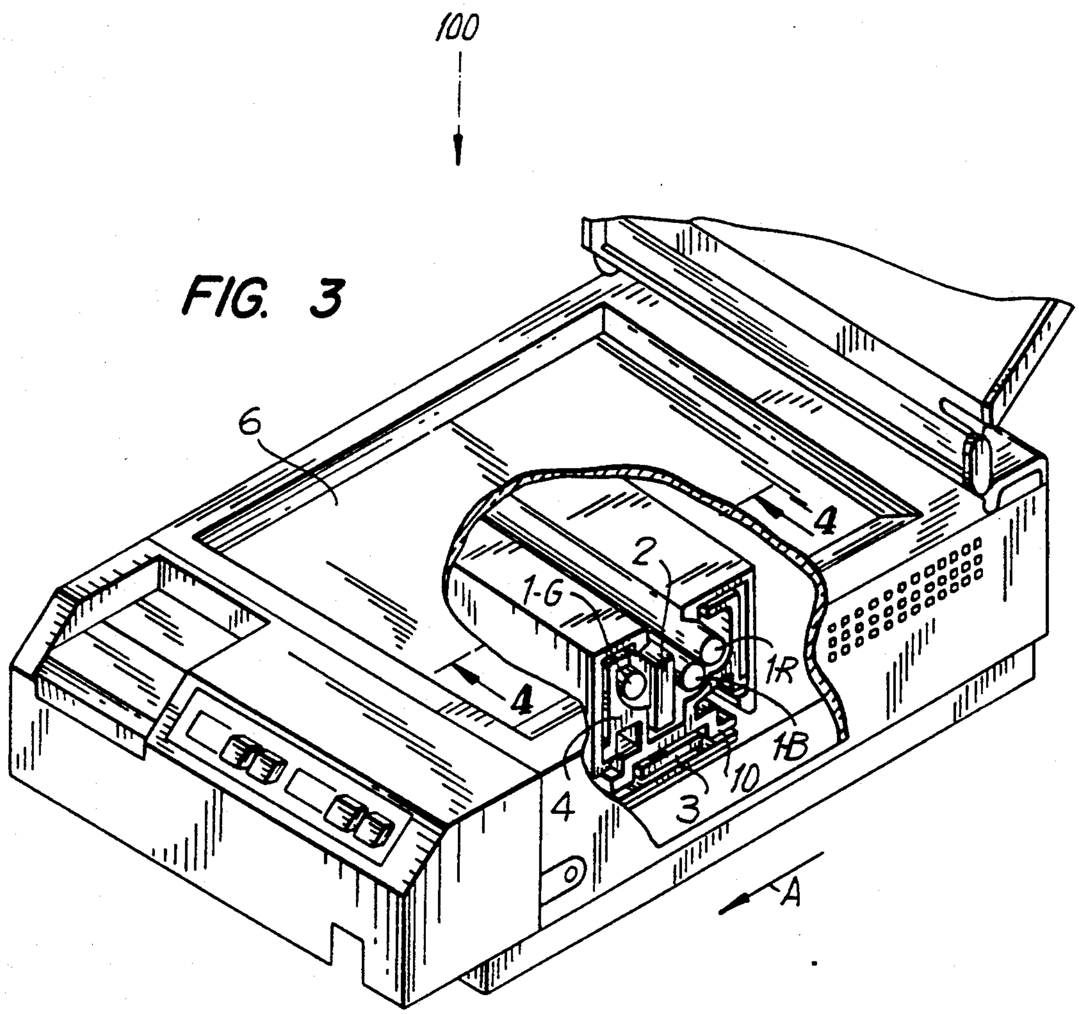
FIG. 3 is a perspective view of an image input device in accordance with the invention.
Figure 4:
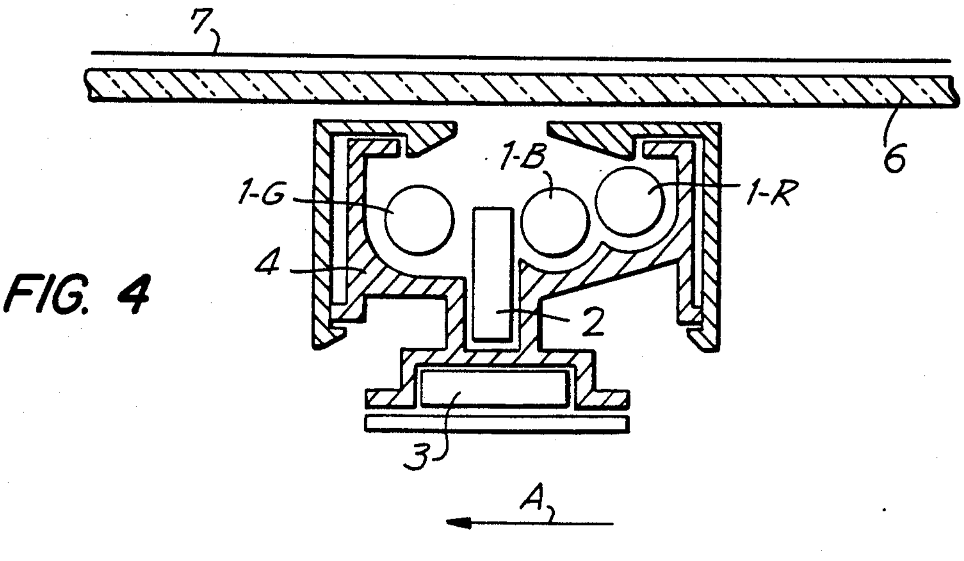
FIG. 4 is a sectional view taken along 4—4 of FIG. 3.

FIGS. 3 and 4 illustrate a basic structure of an image input device 100 in accordance with the invention. Image reading unit 10 is shifted successively to read in a direction indicated by arrow A in FIG. 3 by a driving device such as a stepping motor or similar device through a timing belt, wire or the like (not shown).

Three cold cathode discharge tubes 1-R, 1-B, 1-G charged with rare gas, emitting red, blue and green lights respectively, constitute a lighting apparatus and are used for reading a picture image 7 placed on a glass bed 6. A reflector 4 reflects light from the lighting apparatus and condenses the light in the direction or picture image 7.

Red discharge tube 1-R is charged with neon gas at a pressure between about 10 and 50 Torr, preferably 20 Torr. A red color is obtained through luminescence of the charged gas only. An aperture formed by a white film of titanium oxide powder or similar material, either on the inside or the outside of the tube wall, will be effective in directing the light efficiently for irradiation.

The blue and green discharge tubes 1-B, 1-G are charged with xenon gas at pressures between about 60 and 150 Torr, preferably 80 Torr. The amount of light obtained is proportional to the charging pressure. However, the voltage required increases proportionally with the charging pressure, increasing the cost. Thus, it is not desirable for the charged gas pressures to be too high and those indicated above are sufficient.

Figure 14:
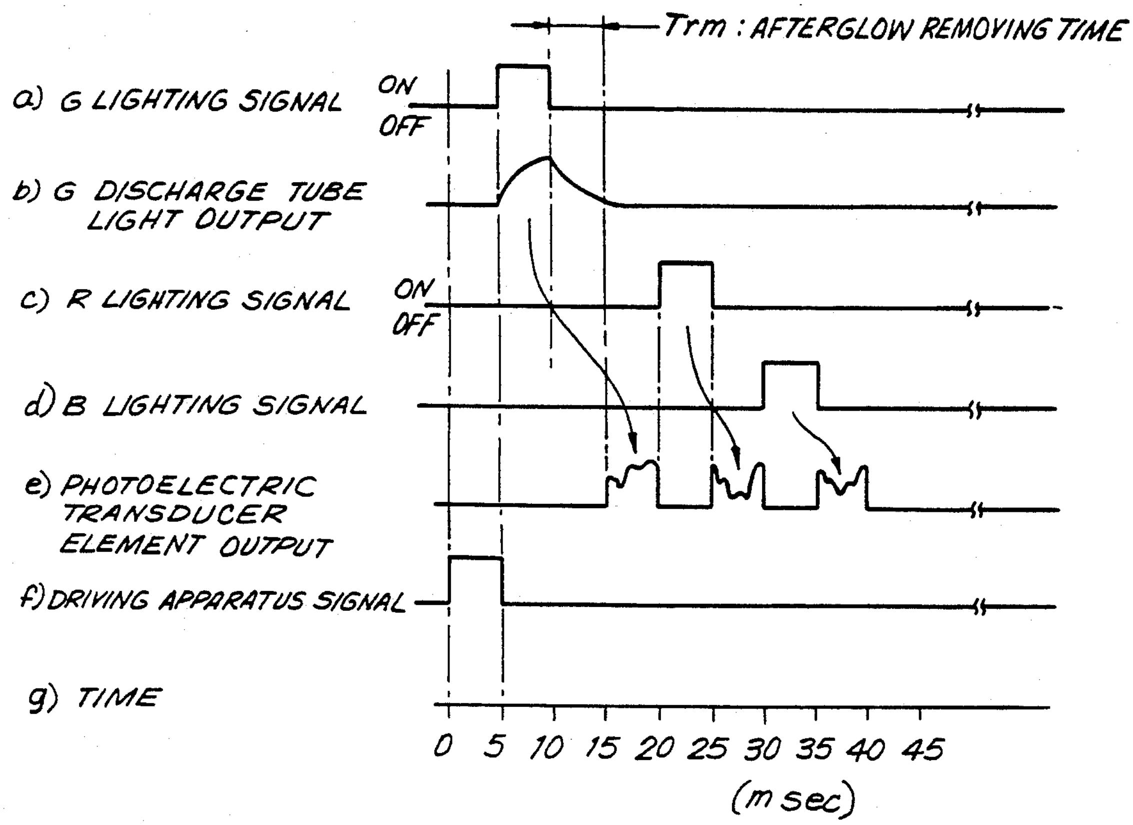
FIG. 14 illustrates a timing chart for a rare gas cold cathode discharge tube and a photoelectric transducer element for line sequential reading.
Figure 16:
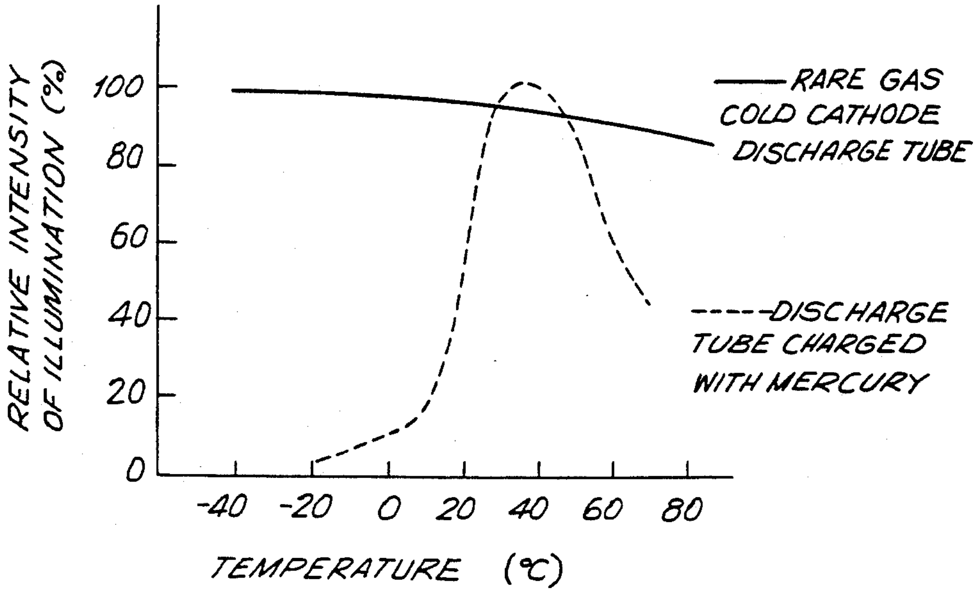
FIG. 16 illustrates the relationship between temperature and the intensity of illumination of a rare gas cold cathode discharge tube and a discharge tube charged with mercury.

Referring now to FIGS. 4 and 14, a color picture reading method is described. In line sequential reading, the image reading device 10 shown in FIG. 4 is first shifted as far as image reading position at which driving apparatus signal f is applied. Next lights of the three primary colors are irradiated on picture image 7 by lighting signals a, c, d in succession and the reflected lights are imaged on a photoelectric transducer element 3 by an imaging system 2. The output e of photoelectric transducer element 3 is amplified, processed and sent to a host computer (not shown) as a one-dimensional image of red, blue and green of the picture image. The method described above is repeated as image reading unit 10 is shifted gradually in the direction of arrow A parallel to picture image 7 to store one-dimensional color image data. Thus, a two-dimensional color image is obtained using a one-dimensional photoelectric transducer element 3.

During line sequential reading, the rare gas cold cathode discharge tubes are lit for about 5 milliseconds each, and the photoelectric transducer element operates for about 5 milliseconds. Thus the basic reading operation is finished in about 30 milliseconds. The lighting time and reading period are representative in value. The signal precision and read rate can be enhanced by properly selecting the rare gas cold cathode discharge tubes and the sensitivity of the photoelectric transducer element.

In the case of green rare gas cold cathode discharge tubes, an afterglow is produced when ultraviolet rays of xenon gas are converted into visible light due to the physical properties of the fluorescent substance. Consequently, afterglow removing time $T_{rm}$ (shown in FIG. 14) must be set when using a MOS-type photoelectric transducer element in which light storage time varies for each picture element. If $T_{rm}$ is not set, the irradiation light of the next red color and the green light are mixed to irradiate the picture image and it is difficult to extract a high precision three primary color signal which leads to deterioration of the reproducibility of the picture image. Preferably, $T_{rm}$ is short since it may directly influence the read rate. Thus, $T_{rm}$ should be between about 1 and 20 milliseconds and preferably 5 milliseconds in the case of the existing fluorescent substance.

For improving the lighting stability and durability characteristic of the rare gas cold cathode discharge tube, preliminary lighting (intermittent or normally light on) will be effective for 10 to 100 milliseconds before start of reading, and the light is put out when resetting the image reading unit 10 to a reference position after the reading is over. In addition, to correcting the unevenness of the longitudinal light of the rare gas cold cathode discharge tube, a white reference picture image uniform in reflection factor is read, and the read data of the picture image is corrected by the reference data. Thus image data with high quality density reproducibility is loaded.

Xenon is the proper rare gas to charge in the rare gas cold cathode discharge tube when the excitation wavelength of the fluorescent substance utilized is 254 nm of the ultraviolet rays or mercury. However, a rare gas other than xenon may be used for developing a fluorescent substance having an excitation wavelength adjusted to a wavelength of the light emitted by the rare gas. For example, helium is the appropriate charged rare gas when a fluorescent substance having an excitation wavelength of 389 nm is used. Rare gasses such as argon, crypton, radon and the like may also be used.

As shown in FIG. 4, image reading unit 10 can be compactly constructed by using either a plate-like or rod-like glass having a refractive index distribution as imaging system 2. Light radiated from discharge tubes 1-B, 1-G, 1-R is condensed by imaging system 2 and irradiated on photoelectric transducer element 3. A reflector 4 formed of a white resin such as polycarbonate or the like functions to reflect light from the lighting apparatus and condense the light in the direction of picture image 7.

Figure 11:
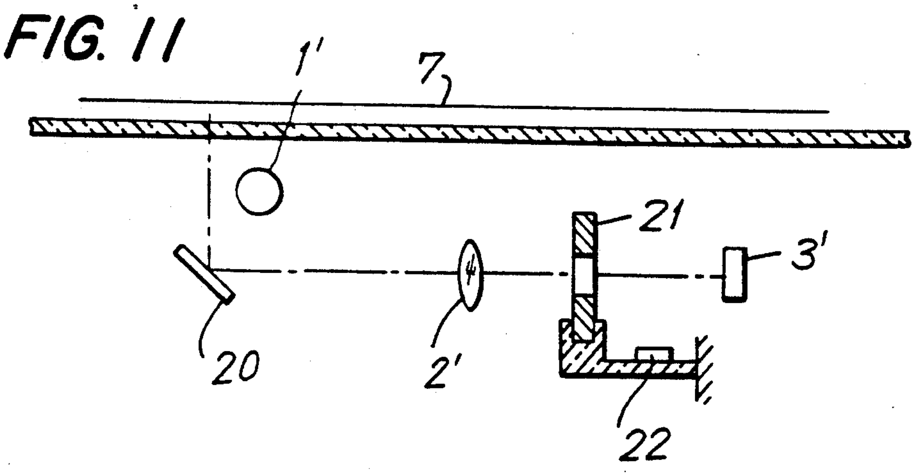
FIG. 11 illustrates an image system for an image input device in accordance with an eighth embodiment of the invention.

FIG. 11 illustrates an optical system of an image input device in accordance with an eighth embodiment of the invention. In the above described embodiments, color separation is carried out by switching a tricolor light source. In this embodiment color separation is by a filter. First, picture image 7 is irradiated by a white rare gas cold cathode discharge tube 1' (called a three wavelength type which emits three kinds of light), which is obtained by mixing a fluorescent substance emitting green, red and blue lights and applying the mixed fluorescent substance to a rare gas cold cathode discharge tube. An image is formed on a CUD (charge coupled device) 3' by imaging system 2'. More than one mirror 20 may be used to minimize the size of the device. To separate the colors, a tricolor filter 21 is disposed in the imaging optical path. Tricolor filter 21 is shifted by a driving device 22 to successively bring a filter passing each of the three desired colors into the imaging optical path. The rate at which filter 21 is shifted is about once every few milliseconds. Thus, driving device 22 may move a built-up piezoelectric element, the tricolor filter 21 being segmented by 120 degrees, to a trioolor disposition on rotation of the motor.

The three-wavelength type white cold cathode discharge tube 1' is used on intermittent light chiefly for adjusting the quantity of light inputted to the photoelectric transducer element (MOS type, CUD or the like).

Figure 18:
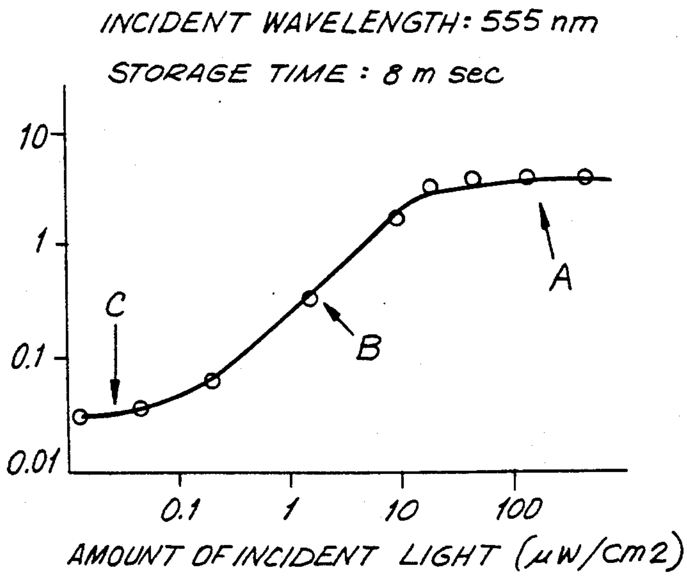
FIG. 18 illustrates the photoelectric conversion characteristic of a storage type photoelectric transducer element.

FIG. 18 illustrates the conversion characteristic of a MOS type photoelectric transducer element consisting of amorphous silicon. The conversion characteristic of a MOS-type photoelectric element is similar to a CUD-type photoelectric element. In a storage type photoelectric transducer element, an output is obtained in proportion to an integrated quantity of the light irradiated within the reading period (domain B in the drawing). However, when there is no incident light, a background output noise (domain C in the drawing) exists, which is referred to as a dark output. The precision of the read signals is indicated by the S/N ratio and is expressed by the ratio of signal output to dark output. The larger the S/N ratio, the higher the precision. However, there is a saturation threshold of the integrated quantity of light to the photoelectric transducer element (domain A in the drawing). Once the saturation threshold is reached, the output becomes constant even when more light is applied. Thus, a change in the density or the picture image cannot be definitively read. Accordingly, to achieve a high precision output, the amount of light will be in domain B of FIG. 18. For best results, the amount of light will be just below the saturation point.

The lighting time of the rare gas cold cathode discharge tube should be set at an optimal time. However, the quantity of light emitted by the rare gas cold cathode discharge tube varies slightly from tube to tube. If the outgoing signal is saturated (domain A in FIG. 18), then the output becomes constant and does not provide the image density. Thus, the lighting time set at the time of shipment is set less than a time at which the output is saturated.

In addition, the amount of light deteriorates gradually with continuous use and the S/N ratio drops. Thus the inherent capacity of the photoelectric transducer cannot be fully realized. A precision signal output is obtained by adjusting the lighting time of a light source to set an optimal amount of light for the photoelectric transducer element whenever the image input device is used. Intermittent lighting is carried out to make the lighting time variable. The quantity of light may be stabilized by using a conductive member according to the method given in the above described embodiment.

Figure 12:
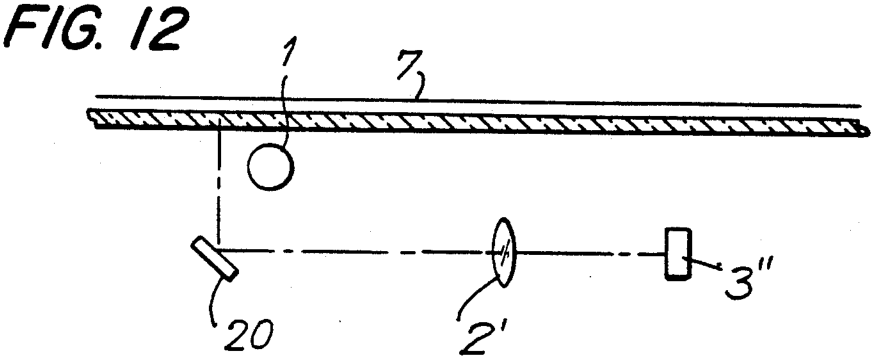
FIG. 12 illustrates an image system for an image input device in accordance with a ninth embodiment of the invention.

FIG. 12 illustrates an optical system of an image input device in accordance with a ninth embodiment of the invention. Color separation data can be loaded in at a time by providing the photoelectric element 3" with a filter during the manufacturing stage. Additionally, a mechanical operating part (motor) is not required for color separation, and as a result there is no vibration of light. The three wavelength type white cold cathode discharge tube 1' is used also as intermittent lighting in this embodiment in order to adjust the amount of light inputted to the photoelectric transducer element. The conductive member is preferably used in the same manner as described above. Like reference numerals are used to identify like elements from FIG. 11.

Figure 13:
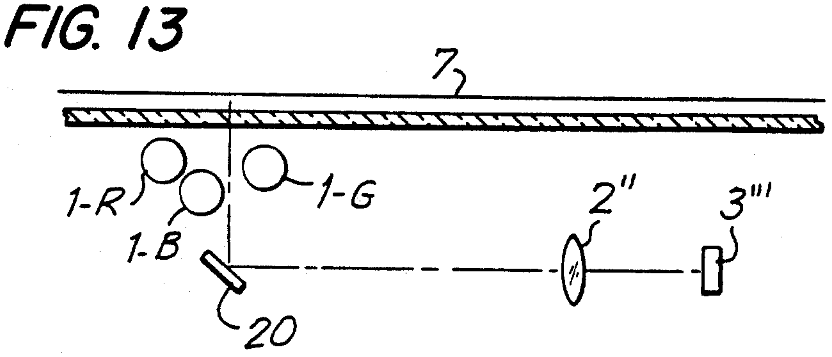
FIG. 13 illustrates an image system for an image input device in accordance with a tenth embodiment of the invention.

FIG. 13 illustrates an optical system for an image input device in accordance with a tenth embodiment of the invention. While the image input device depicted in FIG. 4 uses a same magnifying imaging optical system, an optical system 2" reduces the image to one-fifth to one-tenth or so for application to CUD 3'".

As described above, the intermittent lighting method is required for use with discharge tube light sources for adjusting light and for line sequential reading for color correction. Additionally, high frequency noise of between about 20 and 30 KHz produced at the time of discharge tube lighting during normal reading, is capable of exerting a deteriorating influence on the output of the photoelectric transducer element. It is therefore effective to carry out intermittent lighting on the discharge tubes in accordance with the invention, including the three wavelength type cathode tube, and also to generate the output of the photoelectric transducer element when turning off the light.

As described above, according to the invention, a rare gas cold cathode discharge tube functions to stabilize the amount of light even during intermittent lighting when the light is turned on and off repeatedly in a period of several milliseconds. Further, a rare gas cold cathode discharge tube in accordance with the invention for use as a lighting apparatus can be used in a moderately priced image input device which occupies a relatively small amount of space and ensures good color reproducibility. The light adjusting function of the invention further improves the S/N ratio of the read images.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An image input device comprising:

a rare gas cold cathode discharge tube comprising linear tube charged with a rare gas; a pair of spaced main electrodes in said linear tube, one of said main electrodes generating an electron beam when the linear tube is powered; an auxiliary electrode extending along at least a portion of said linear tube in the direction of the length thereof; and a conductive member positioned near said one of said main electrodes for preventing deflections of a positive column extending from said one of said main electrodes essentially parallel to said auxiliary electrode; said cold cathode discharge tube irradiating a picture image along the line defined by said positive column;

photoelectric transducer means for reading the irradiated picture image; and means for intermittently powering said cold cathode discharge tube for the selective illumination of the picture image.

2. The image input device, as claimed in claim 1, wherein said rare gas cold cathode discharge tube has at least two different luminous colors.

3. The image input device as claimed in claim 2, wherein said rare gas cold cathode discharge tube has the three primary luminous colors, and including filter means intermediate said picture image and said photoelectric transducer means.

4. The image input device as claimed in claim 1, and including means for displacing said cold cathode discharge tube anu photoelectric transducer means relative to said picture image between a plurality of positions, said cold cathode discharge tube being powered on and off at each of said positions so that the irradiated picture image may be read by said photoelectric transducer means at each said position.

5. The image input device as claimed in claim 1, and including a plurality of said rare gas cold cathode discharge tubes each provided with a different luminous color, and including means for successively powering each of said tubes on and off to successively irradiate said picture image by each of said different colors.

6. The image input device as claimed in claim 5, and including means for focusing the positive column of each of said tubes along essentially a single line on said picture image.

7. The image input device as claimed in claim 6, wherein each of said cold cathode discharge tubes is one of the primary colors.

8. The image input device as claimed in claim 5, when including means for displacing said plurality of tubes and said photoelectric transducer means along said picture image between a plurality of discreet positions and including means for sequentially powering each of said tubes on and off at each of said positions.

9. The image input device as claimed in claim 7, including means for displacing said plurality of tubes and said photoelectric transducer means along said picture image between a plurality of discreet positions and including means for sequentially powering each of said tubes on and off at each of said positions.

10. The image input device as claimed in claim 9, including means for reading the photoelectric transducer means after the powering of each of said tubes and in an interval between the powering of successive tubes.

11. The image input device as claimed in claim 10, and including an afterglow removing interval intermediate the turning off of the tube for the green luminous color and before the reading of the photoelectric transducer means.

12. The image input device as claimed in claim 1, wherein the photoelectric transducer means produces an output in proportion to an integrated quantity of the light applied thereto within the reading.

13. The image input device as claimed in claim 12, wherein said photoelectric transducer means is a CUD.

14. The image input device as claimed in claim 12, wherein said photoelectric transducer means is illuminated so that the output thereof lies between a dark output corresponding to the output when light is not irradiated on the photoelectric transducer means and a saturation output caused by irradiation of light above predetermined level.

15. A method for reading a picture image, comprising:

irradiating an essentially straight line on said picture image by the successive intermittent powering of a rare gas cold cathode discharge tube associated with each of the three primary colors, each said tube being provided with a linearly extending auxiliary electrode for defining a positive column which in turn provides an essentially linear irradiation;

reading the irradiated picture image by a storage type photoelectric transducer means as to the powering of each or said tubes and reading the contents of said photoelectric transducer means; and incrementally displacing said tubes and said photoelectric transducer means between a plurality of positions along the picture image, the foregoing steps being repeated at each of said positions to define a two-dimensional picture image.

16. The method of claim 15 and including preventing deflections of the positive column by providing a conductive member positioned near the discharge electrode of each of said tubes.

17. The method of claim 16 including the step of color correcting the read picture image from said photoelectric transducer means depending on the color of the immediately proceeding irradiated tube.

18. A method for reading a color picture image, comprising:

repetitively irradiating a line on said image by means of a rare gas cold cathode discharge tube which is successively powered on and off and which has at least the three primary luminous colors;

successively reading the irradiated line by a storage type photoelectric transducer means through successive filters each associated with one of the three primary colors and reading the successive picture image components from the photoelectric transducer means; and successively displacing the tube and the photoelectric transducer means between a plurality of discreet positions along the picture image at each of which said successive irradiations of the picture image and reading by and from said photoelectric transducer device occurs to produce a two-dimensional picture image.

19. The method of claim 18, and including the further step of color correcting the picture image read from the photoelectric transducer means in accordance with the color of the filter used to store the picture image inset photoelectric transducer means.

* * * * *